United States Patent
Gruca

(12)
(10) Patent No.: US 6,645,373 B2
(45) Date of Patent: Nov. 11, 2003

(54) DUAL ELEMENT WATER SENSING FUEL DISPENSER FILTER

(75) Inventor: Michael J. Gruca, Mt. Carmel, IL (US)

(73) Assignee: Champion Laboratories, Inc., Albion, IL (US)

( * ) Notice: Subject to any disclaimer, the term of this patent is extended or adjusted under 35 U.S.C. 154(b) by 109 days.

(21) Appl. No.: 10/055,450

(22) Filed: Jan. 23, 2002

(65) Prior Publication Data

US 2003/0136726 A1 Jul. 24, 2003

(51) Int. Cl.[7] .............................................. B01D 27/14
(52) U.S. Cl. ...................... 210/96.1; 210/315; 210/440; 210/489; 210/490; 210/493.1; 210/502.1
(58) Field of Search ................................ 210/96.1, 315, 210/316, 317, 440, 489, 490, 493.1, 502.1, 689, DIG. 6

(56) References Cited

U.S. PATENT DOCUMENTS 4,485,011 A * 11/1984 Cole et al. ................. 210/96.1
4,539,107 A * 9/1985 Ayers ........................ 210/96.1
4,588,500 A * 5/1986 Sprenger et al. ............ 210/100

* cited by examiner

Primary Examiner—Matthew O. Savage
(74) Attorney, Agent, or Firm—Olson & Hierl, Ltd.

(57) ABSTRACT

The dual element water sensing fuel dispenser filter comprises a housing with an open end. An end plate is positioned in the open end. Contained within the housing is a filter element assembly that includes a first filter portion and a second filter portion. The first filter portion is formed from an annular pleated paper filter media comprised of two layers with a water sensing chemical therebetween. Disposed within the pleated paper filter media are a pair of generally concentric perforate cores containing a chemical fill therebetween. The pleated paper filter media will remove particulate matter from the fuel, whether the fuel be gasoline or an alcohol-gasoline blended fuel. The water sensing chemical in the pleated paper filter media will sense and remove water from the gasoline fuel. The chemical fill will sense the phase separation in the alcohol-gasoline blended fuel and will swell and gell to preclude water from passing through the filter.

20 Claims, 3 Drawing Sheets

DUAL ELEMENT WATER SENSING FUEL DISPENSER FILTER

BACKGROUND OF THE INVENTION

A. Field of the Invention

This invention pertains to a dual element water sensing fuel filter that can be used in a dispenser to remove particulate matter in specific fuels, for example, gasoline and alcohol-gasoline combinations. More particularly, the present invention pertains to a single filter that can be used to remove water from either gasoline or alcohol-gasoline combinations, thereby obviating the need for a gas station owner to change filters to accommodate the specific fuel being pumped and detect water in the fuel, since, ordinarily, the water reacts with the alcohol and requires a separate filter.

B. Description of Related Art

It is common to use alcohols with gasoline in many parts of the United States. Some gas stations will use an alcohol-gasoline combination year round, some seasonally and some randomly. Roughly, the seasonal transitions occur Labor Day and Memorial Day. In the Fall and Winter, alcohol is used to help vaporize the gasoline in cold weather. However, it is removed in the Spring and Summer to prevent vapor lock in the vehicle engine. Alcohol can also be added to provide a cleaner burning fuel and reduce ozone forming emissions. A fuel dispenser filter is used to sense the water in the fuel being pumped and indicate the presence of water by drastically reducing the flow of fuel.

Presently, a separate filter is used for the gasoline and a separate filter is used for the gasoline-alcohol blended fuel, since water reacts with the alcohol.

C. Summary of the Invention

An object of the present invention is to provide an improved fuel dispenser filter that can be used for either gasoline or a gasoline-alcohol additive (for example, ethanol or methanol) combination, so as to obviate the need for changing the known filters when changing fuels.

Another object of the present invention is to provide a dual element water sensing fuel dispenser filter that can be used throughout the year for removing particulate and detecting water in the fuel, whether the fuel be gasoline or an alcohol gasoline combination.

Yet another object of the present invention is to provide a dual element water sensing fuel dispenser filter that incorporates a chemical fill for sensing water contamination in an alcohol blended gasoline and a water sensing chemical for sensing the water contamination in the fuel, whereby, a single fuel dispenser filter can be used throughout the year for filtering an alcohol blended gasoline or a non-alcohol gasoline.

Other objects and advantages of the present invention will become more apparent hereinafter.

BRIEF DESCRIPTION OF THE DRAWING

There is shown in the attached drawing a presently preferred embodiment of the present invention, wherein like numerals in the various views refer to like elements and wherein.

DETAILED DESCRIPTION OF THE PRESENT INVENTION

Figure 1:
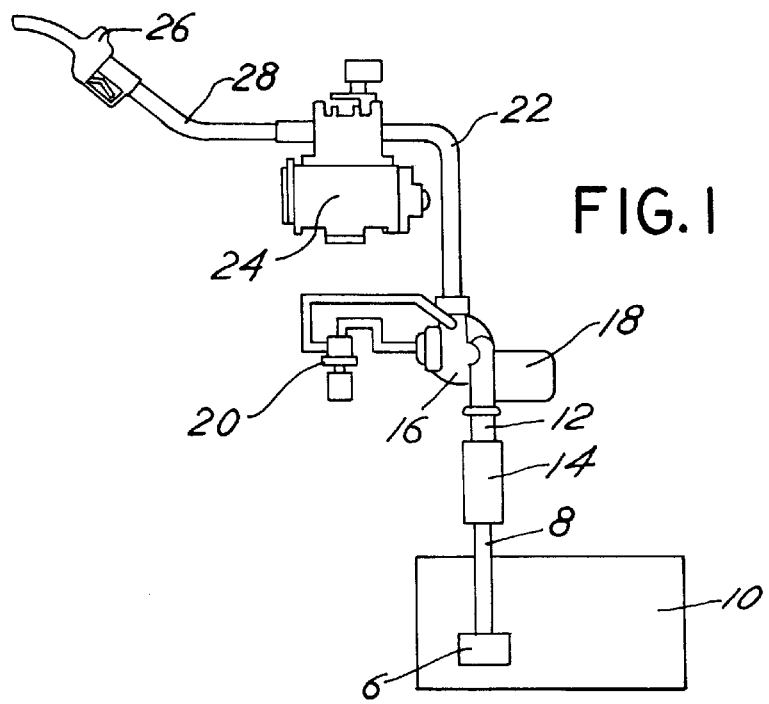
FIG. 1 is a schematic view of a fuel dispenser installation incorporating the dual element fuel dispenser filter of the present invention.

There is shown in FIG. 1 a typical service station fuel dispenser installation that can incorporate the fuel dispenser filter of the present invention. The installation, which can be in a gas station, for example, incorporates a reservoir or storage tank 10 either above or below the ground, which contains the fuel to be dispensed. The fuel can be gasoline or a gasoline-alcohol blended fuel. The alcohol may be ethanol or methanol, though presently, ethanol is more commonly used. The ethanol-gasoline blended fuels are referred to as oxygenated gasoline, reformulated gasoline or conventional gasoline containing ethanol. Ethanol is widely used and available in most of the United States. The use of ethanol as a fuel component will improve combustion, improve octane, and reduce carbon dioxide emissions and ozone forming emissions. Ethanol also picks up moisture in the fuel system and prevents fuel line freeze.

A submersible pump 6 located on the end of line 8 and submerged in storage tank 10 near the bottom. Line 8 is connected to shear valve 14. A line 12 is connected from a shear valve 14 and extends upwardly for connection to the fuel dispenser filter 18 of the present invention. The fuel dispenser filter 18 is connected to the primary valve 16, which is activated by a two-stage pilot valve 20. Extending from the primary valve 16 is a line 22 that communicates with a product meter 24 that is connected to a nozzle 26 by a line 28.

In operation, fuel passes from the pump 6 in the tank 10, through line 8 to the shear valve 14 and out through line 12. The fuel then passes through the fuel dispenser filter 18, where it is filtered and strained. Filtered fuel passes through a two-stage pilot valve 20 and primary valve 16, line 22, product meter 24, and line 28 to the nozzle 26. Fuel can be discharged from the nozzle 26 into the tank of a vehicle.

Figure 3:
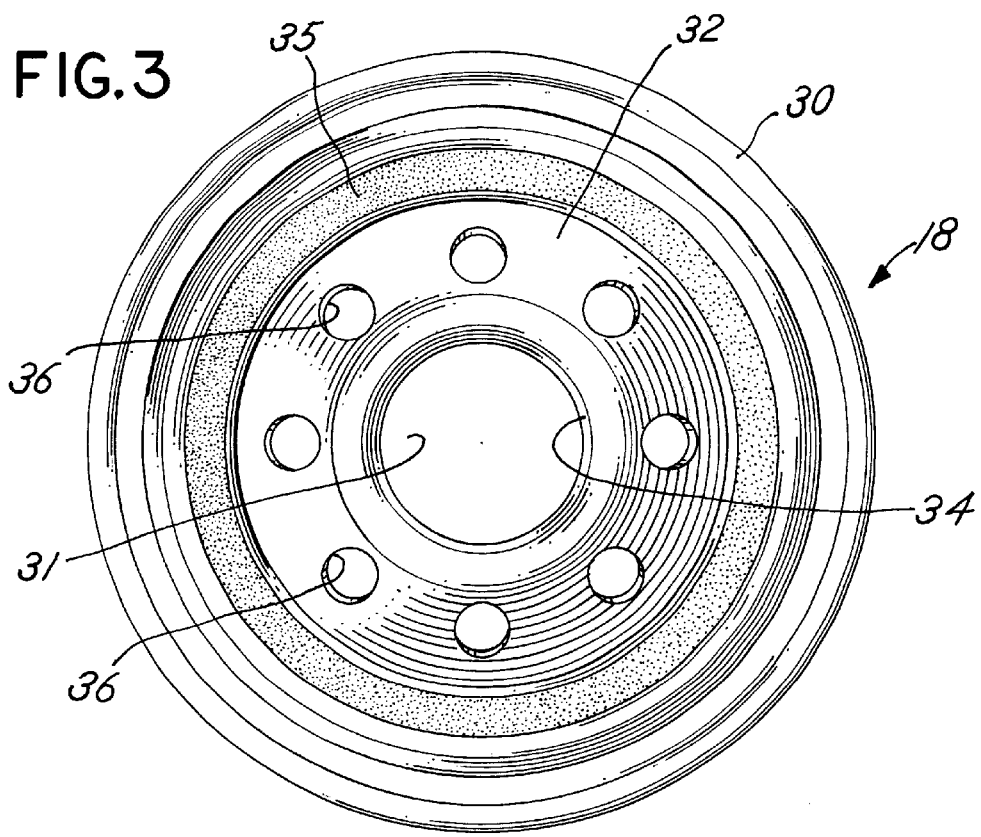
FIG. 3 is a bottom view of the dual element water sensing fuel dispenser filter of FIG. 2.
Figure 2:
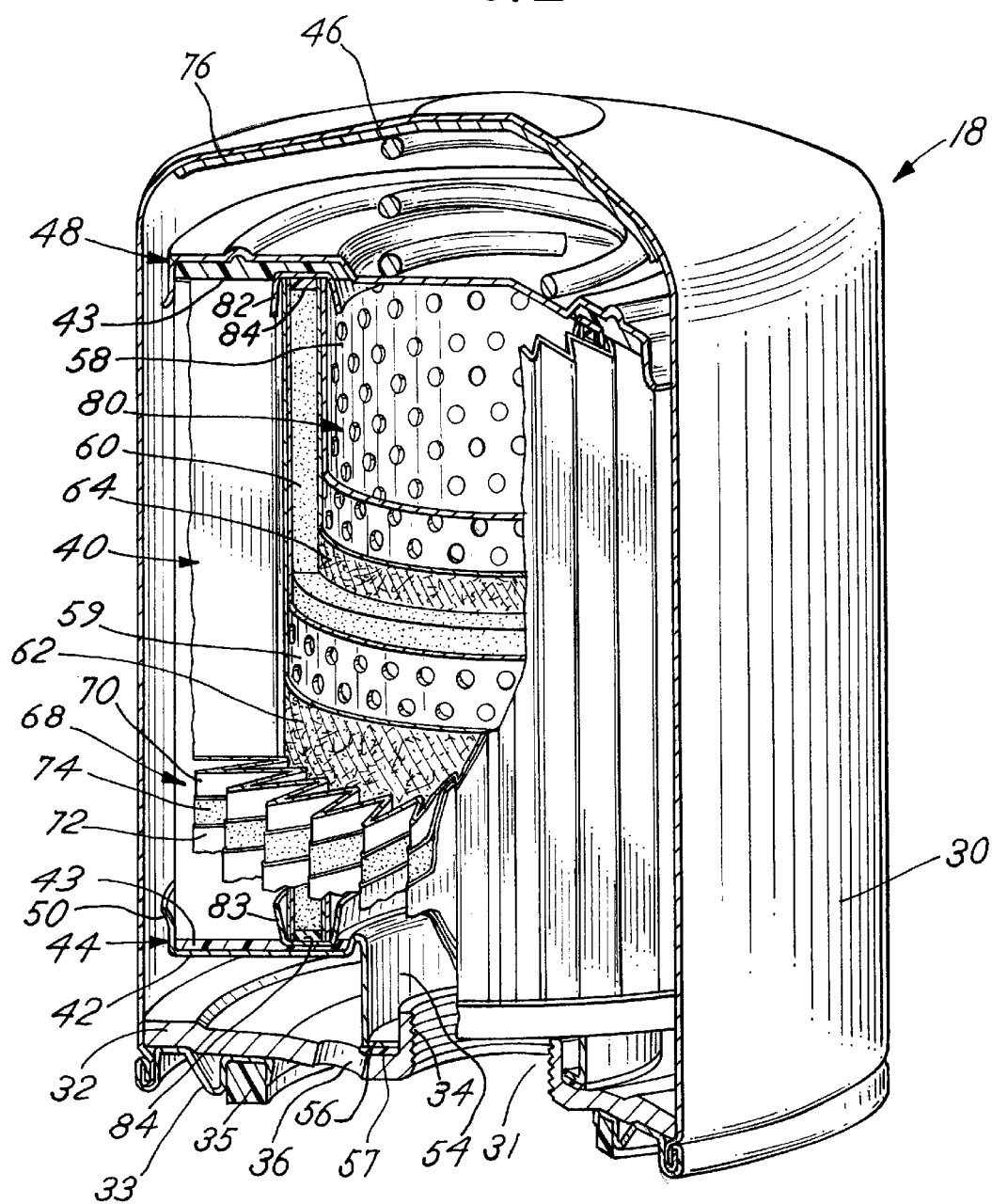
FIG. 2 is an elevation view of the dual element water sensing fuel dispenser filter of the present invention, with parts broken away.

Turning to FIGS. 2 and 3, there is shown the dual element water sensing fuel dispenser filter 18 of the present invention. The dispenser filter 18 comprises a housing 30 having an open end. An end plate 32 closes the open end of the housing 30. An annular retainer 33 is welded and sealed to end plate 32 then rolled with the end of the housing 30 in order to hold the end plate 32 in place in the housing 30. The retainer 33 has a recess therein for receiving a seal member 35. The seal member 35 may be fabricated from a synthetic rubber material and may be substantially square in cross section, as seen in FIG. 2. The end plate 32, as seen in FIGS. 2 and 3, has an annular flange 34 defining an outlet opening 31 and a plurality of inlet openings 36 disposed radially outwardly of the outlet opening 31. There may be one or more openings 36 defining inlet opening means.

The annular flange 34 is defined by the inwardly extending wall of the end plate 32 that may be internally threaded in order to receive a male attachment member (not shown). Thus, the fuel dispenser filter 18 may be characterized as a spin-on filter, though, as will be apparent to persons skilled in the art, other arrangements may be employed for securing the fuel dispenser filter 18 to a support.

Figure 4:
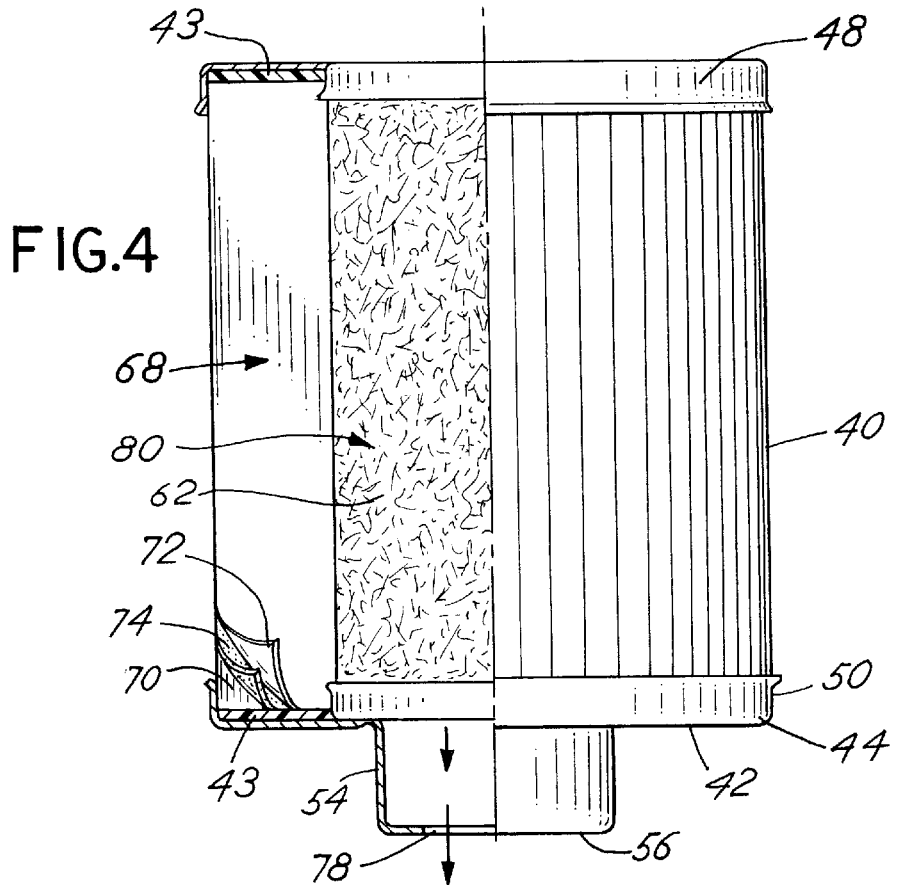
FIG. 4 is an elevation view of the internal filter element assembly of the present invention, with the outer housing removed.

A filter element assembly 40, as shown in FIGS. 2 and 4, is disposed within the housing 30 and is held in place against the end plate 32 by a spring 46. There is an end cap 48 at the top of the filter element assembly 40 and an end cap 44 at the bottom of the filter element assembly 18.The spring or resilient member 46 is disposed between the top of the housing 30 and the end cap 48 at the upper end of the filter element assembly 40. A disc 76 made from fiber is located between the spring 46 and the housing 30 to prevent the spring 46 from penetrating the epoxy coating on the housing 30 and causing a metal-to-metal contact point with potential for an external leak.

The shelf or flat portion 42 of the holder or end cap 44 is generally horizontal as seen in FIG. 2. At the outer end the shelf 42 has an upwardly extending flange 50 for engaging and retaining the bottom of the filter element assembly 40 against lateral movement with respect to the vertical axis of the housing 30. Depending downwardly from the shelf 42 of the end cap 44 is a generally vertical annular wall 54 that has an annular flange 56 at the lower end thereof that engages on annular seal 57 that rests on the end plate 32. The spring 46 biases the holder 44 against the annular seal 57 to seal between the holder 44 and the end plate 32. The spring 46 biases the end cap 44 against the annular seal 57 to seal between the end cap 44 and the end plate 32.

Figure 5:
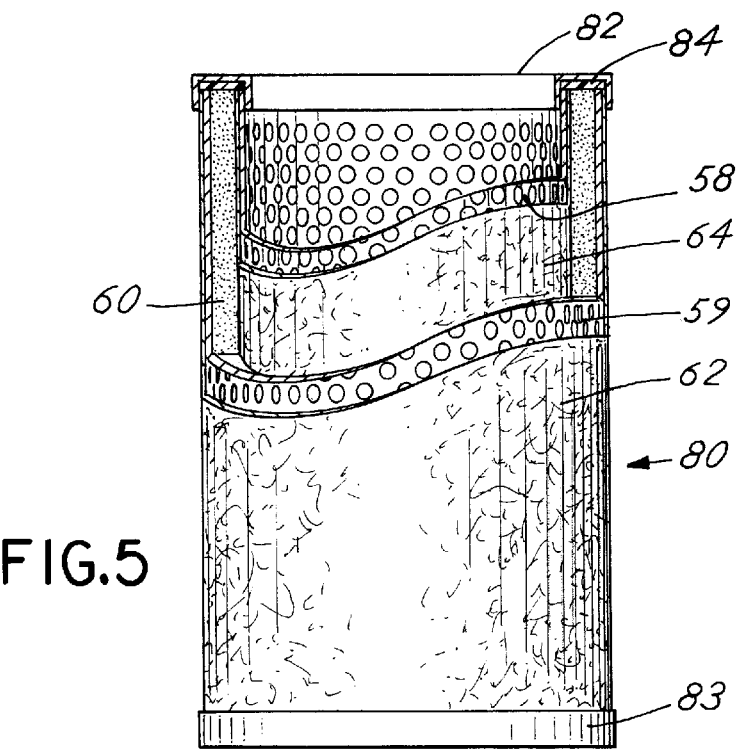
FIG. 5 is an elevation view of the chemical core subassembly of the filter element assembly of the present invention.

The filter element assembly 40, as shown in FIGS. 2 and 5, includes a chemical core subassembly 80 comprising a pair of spaced apart, generally concentric perforate cores 58 and 59 containing a chemical fill means 60 therebetween. The generally concentric cores 58 and 59 are sealed at the ends with adhesive 84 and end caps 82 and 83, respectively. To help retain the chemical fill means 60 between the cores 58 and 59 while still allowing fluid flow through the chemical fill means 60, the outside of the core 58 and the outside of the core 59 are wrapped with thin layers of cloth 64 and 62, respectively, for example, a polyester cloth.

The chemical fill means 60 is adapted to sense the phase separation in an alcohol blend gasoline, such as a methanol gasoline blend or an ethanol gasoline blend, and sense any water therein. The chemical fill means 60 may comprise a water soluble resin and hydroxyethylcellulose. Preferably, the water soluble resin may be a polyether, for example, polyethylene oxide. Commercially, this product is available as UCARFLOC Polymer 304 made by Union Carbide. Preferably, the hydroxyethylcellulose is agglomerated and the chemical fill means is blended in the ratio of one part water soluble resin to three parts of hydroxyethylcellulose. A suitable commercially available hydroxyethylcellulose product is manufactured by Hercules Incorporated and sold under the name NATROSOL®.

The filter element assembly 40, as shown in FIG. 4, is generally in the form of a cylinder closed at one end by end cap 48 and at the other end by end cap 44. The end cap 44 has an opening 78, which receives the annular flange 33 on the end plate 32 (See FIG. 2).Centrally disposed in the filter element assembly 40 is the chemically filled double walled core subassembly 80, as shown in more detail in FIG. 5. Around the outside of the core subassembly 80 is a convoluted ring of tri-layed, chemically treated media 68. The filter media 68 and the core subassembly 80 are sealed in the end caps 48 and 44 with a bonding adhesive 43.

The filter media 68 is preferably a pleated paper having a base layer 70, an outer layer 72, and a water sensing chemical 74 disposed between the inner or base layer 70 and the outer layer 72. The water sensing chemical 74 that can be secured, for example, laminated, to the outer layer 72 of the filter media 68 is preferably a water absorbent polyacrylate. In a presently preferred embodiment of the present invention, the water absorbent polyacrylate is secured to the outer layer 72, for example, by lamination or other like application means, on the order of six (6) grams per square foot.

In operation, the fuel dispenser filter 18 of the present invention is secured in place, as shown in FIG. 1 by the service station operator. Fuel from the storage tank 10 will pass through the line 12 and enter the fuel dispenser filter 18 through the openings 36 (See FIGS. 2 and 3) in the end plate 32 and flow outwardly and upwardly as shown in FIG. 2 and pass first through the pleated media 68. Particulate matter can be filtered from the fuel, whether the fuel be gasoline or an alcohol-gasoline blend, by the paper filter media layers 72 and 70. Water in the fuel can be absorbed by the water sensing chemical 74 between the layers 72 and 70. The gasoline fuel will through the chemical fill means 60 and pass from the fuel dispenser filter 18 through the outlet opening 31 in the end plate 32. The water in the alcohol-gasoline blend passing from the filter media layer 70 into the chemical fill means 60 will cause the chemical fill means 60 to swell and to gell and when there is sufficient swelling and gelling to preclude the further flow of fuel. The result is that the fuel dispenser filter 18 of the present invention will preclude any water in the reservoir or storage tank 10 from reaching the nozzle 26 and being dispensed into a vehicle tank.

The filter element assembly 40 has been described as precluding water from passing through the filter element assembly 40, however, it will be apparent to persons skilled in the art that the chemical fill means can preclude undesired flow of fluid, such as gas, from passing through the filter element assembly 40.

Though the filter element assembly 40 is shown in a specific housing, persons skilled in the art will recognize that the filter element assembly can be employed in housings or environments other than the specific housing shown in FIG. 2.

While I have shown and described a presently preferred embodiment of the present invention, it will be apparent to persons skilled in the art that the invention may be otherwise embodied within the scope of the following claims.

I claim:

1. A dual element water sensing fuel dispenser filter comprising a housing having an open end, an end plate closing the open end of the housing, the end plate having a central opening defining an outlet opening and at least one opening spaced radially outwardly from the central opening, said at least one opening defining an inlet opening, a filter element assembly within said housing, the filter element assembly being constructed and arranged with the housing so that fuel flow enters the inlet opening, flows through the filter element assembly and exits the housing through the outlet opening, said filter element assembly comprising a pair of spaced apart, generally concentric, perforate cores containing a chemical fill therebetween, a pleated paper filter media disposed outwardly from the outermost perforate core, said filter media comprising a base layer, an outer layer and a water sensing chemical enclosed between the two layers, said chemical fill sensing phase separation in an alcohol-gasoline blended fuel, said water sensing chemical sensing water contamination in the fuel, whereby a single fuel dispenser filter can be used throughout the year for filtering either gasoline fuel or alcohol-gasoline blended fuel.

2. A dual element water sensing fuel dispenser filter as in claim 1, wherein the water sensing chemical is a water absorbent polycrylate.

3. A dual element water sensing fuel dispenser filter as in claim 1, wherein the chemical fill comprises a water soluble resin and hydroxyethylcellulose.

4. A dual element water sensing fuel dispenser filter as in claim 3, wherein the water soluble resin and the hydroxyethlcellulose are blended in the ratio of one to three by weight.

5. A dual element water sensing fuel dispenser filter as in claim 1, wherein the chemical fill comprises a water soluble resin and an agglomerated hydroxyethylcellulose.

6. A dual element water sensing fuel dispenser filter as in claim 1, wherein the chemical fill comprises a water soluble resin and an agglomerated hydroxyethylcellulose are blended in the ratio of one to three by weight.

7. A dual element water sensing fuel dispenser filter as in claim 1, wherein the pair of perforated cores include an outer perforated core that is wrapped with a polyester cloth wrap to allow fuel to flow therethrough and to retain the chemical fill.

8. A dual element water sensing fuel dispenser filter as in claim 1, wherein the pair of perforated cores includes an inner perforated core that is wrapped with a polyester cloth wrap to allow fuel to flow therethrough and to retain the chemical fill.

9. A dual element water sensing fuel dispenser filter as in claim 1, wherein the pair of perforated cores includes an inner perforated core and an outer perforated core, each of the cores being wrapped with a layer of material to allow fuel to flow therethrough and to retain the chemical fill.

10. A dual element water sensing fuel dispenser filter as in claim 1, wherein the water sensing chemical is secured to the outer layer of the filter media.

11. A dual element water sensing fuel dispenser filter as in claim 1, wherein the water sensing chemical is laminated to the outer layer of the filter media.

12. A dual element water sensing fuel dispenser filter as in claim 11, wherein the water sensing chemical is a water absorbent polyacrylate.

13. A dual element water sensing fuel dispenser filter as in claim 12, wherein the water absorbent polyacrylate is applied to the outer layer on the order of six grams per square foot.

14. A dual element water sensing fuel dispenser filter comprising a housing having an open end, an end plate closing the open end of the housing, the end plate having a central opening defining an outlet opening and a plurality of openings spaced radially outwardly from the central opening, said plurality of openings defining an inlet opening, a filter element assembly within said housing, the filter element assembly being constructed and arranged with the housing so that fuel flow enters the inlet opening, flows through the filter element assembly and exits the housing through the outlet opening, said filter element assembly comprising a pair of spaced apart, generally concentric, perforate cores containing a chemical fill therebetween, a pleated filter media disposed outwardly from the outermost perforate core, said filter media comprising a base layer, an outer layer and a water sensing chemical enclosed between the two layers, said chemical fill sensing phase separation in either a methanol-gasoline blend or an ethanol-gasoline blend, said water sensing chemical sensing water contamination in the fuel, whereby a single fuel dispenser filter can be used for filtering methanol-gasoline blend, or ethanol-gasoline blend, or non-alcohol blended gasoline.

15. A dual element water sensing fuel dispenser filter as in claim 14, wherein the filter media is made from paper and the water sensing chemical is a water absorbent polycrylate.

16. A dual element water sensing fuel dispenser filter as in claim 14, wherein the pair of perforated cores includes an inner perforated core and an outer perforated core, each of the cores being wrapped with a layer of material to allow fuel to flow therethrough and to retain the chemical fill.

17. A dual element water sensing fuel dispenser filter comprising a housing having an open end, an end plate closing the open end of the housing, the end plate having a central opening defining an outlet opening and a plurality of openings spaced radially outwardly from the central opening, said plurality of openings defining an inlet opening, a filter element assembly within said housing, the filter element assembly being constructed and arranged with the housing so that fuel flow enters the inlet opening, flows through the filter element assembly and exits the housing through the outlet opening, said filter element assembly comprising a pair of spaced apart, generally concentric, perforate cores containing a chemical fill therebetween, a pleated filter media disposed outwardly from the outermost perforate core, said filter media comprising a base layer, an outer layer and a water sensing chemical enclosed between the two layers, said chemical fill sensing phase separation in an alcohol-gasoline blend, said water sensing chemical sensing water contamination in the fuel, whereby a single fuel dispenser filter can be used throughout the year for filtering an alcohol-gasoline blend, or a non-alcohol blended gasoline.

18. A filter element assembly for use in a fuel dispenser filter, said filter element assembly comprising a core subassembly comprising an inner perforate core and an outer perforate core, the inner and outer cores being spaced apart in a generally concentric fashion, a chemical fill disposed between the inner core and the outer core, a pleated filter media disposed outwardly from the outermost perforate core, said filter media comprising a base layer, an outer layer and a water sensing chemical enclosed between the two layers, said chemical fill sensing phase separation in an alcohol-gasoline blend, said water sensing chemical sensing water contamination in the fuel, whereby a single cartridge can be used for filtering an alcohol-gasoline blend, or a non-alcohol blended gasoline.

19. A cartridge for a fuel dispenser filter as in claim 18, wherein the filter media is made from paper and a water sensing chemical is affixed to the paper, the water sensing chemical being a water absorbent polycrylate.

20. A cartridge for a fuel dispenser filter as in claim 18, wherein the water absorbent polyacrylate is applied to the paper on the order of six grams per square foot.

* * * * *